(12) United States Patent
Pularikkal et al.

(10) Patent No.: US 10,448,249 B2
(45) Date of Patent: Oct. 15, 2019

(54) NETWORK INITIATED DYNAMIC QUALITY OF SERVICE FOR CARRIER WIRELESS LOCAL AREA NETWORK CALLING

(71) Applicant: Cisco Technology, Inc., San Jose, CA (US)

(72) Inventors: Gangadharan Byju Pularikkal, San Jose, CA (US); Mantha Ravi Sankar, Bangalore (IN); Mark Grayson, Berkshire (GB); Swaminathan Anantha, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 15/388,125

(22) Filed: Dec. 22, 2016

(65) Prior Publication Data

US 2018/0184340 A1    Jun. 28, 2018

(51) Int. Cl.
| | | |
|---|---|---|
| *H04W 12/06* | (2009.01) | |
| *H04L 29/06* | (2006.01) | |
| *H04W 84/12* | (2009.01) | |
| *H04W 84/04* | (2009.01) | |
| *H04L 12/66* | (2006.01) | |

(Continued)

(52) U.S. Cl.
CPC ......... *H04W 12/06* (2013.01); *H04L 63/0892* (2013.01); *H04L 12/66* (2013.01); *H04L 63/162* (2013.01); *H04W 28/0252* (2013.01); *H04W 28/0268* (2013.01); *H04W 80/02* (2013.01); *H04W 84/042* (2013.01); *H04W 84/12* (2013.01)

(58) Field of Classification Search
CPC combination set(s) only.
See application file for complete search history.

(56) References Cited

U.S. PATENT DOCUMENTS 9,629,060 B2 * 4/2017 Arora ............... H04W 40/04
9,763,130 B1 * 9/2017 Singh ............... H04W 28/0205
(Continued)

FOREIGN PATENT DOCUMENTS

WO  2013/134669 A1  9/2013
WO  2014/177470 A1  11/2014
(Continued)

OTHER PUBLICATIONS

"Carrier Wi-Fi Guidelines", The WBA Vision, Wireless Broadband Alliance, www.wballiance.com, Carrier Wi-Fi Working Group, Version 0.30, Feb. 7, 2014, 65 pages.
(Continued)

*Primary Examiner* — Ian N Moore
*Assistant Examiner* — Justin T Van Roie
(74) *Attorney, Agent, or Firm* — Edell, Shapiro & Finnan, LLC

(57) ABSTRACT

Presented herein are techniques for detecting establishment of a bearer associated with a communication session offloaded from a mobile carrier network to a wireless local area network, such as a Wi-Fi® network, and sending, from the mobile carrier network to the wireless local area network, an indication of a level of quality of service (QoS) to be applied to a segment of the communication session that is conveyed by the wireless local area network. The indication of the level of QoS may be passed via a network controller.

18 Claims, 6 Drawing Sheets

(51) Int. Cl.
*H04W 80/02* (2009.01)
*H04W 28/02* (2009.01)

(56) References Cited

U.S. PATENT DOCUMENTS

| | | | |
|---|---|---|---|
| 2008/0009267 A1* | 1/2008 | Ramos Robles | H04L 63/1425 455/411 |
| 2008/0165740 A1* | 7/2008 | Bachmann | H04L 63/0272 370/332 |
| 2008/0233951 A1* | 9/2008 | Uchida | H04W 48/18 455/425 |
| 2012/0287784 A1 | 11/2012 | Shatzkamer et al. | |
| 2013/0121194 A1 | 5/2013 | Heshmati | |
| 2014/0213219 A1 | 7/2014 | Mohebbi | |
| 2015/0003435 A1* | 1/2015 | Horn | H04L 5/0058 370/338 |
| 2015/0358889 A1* | 12/2015 | Arora | H04W 40/04 370/338 |
| 2016/0050605 A1* | 2/2016 | Kim | H04W 28/08 370/331 |
| 2016/0227443 A1* | 8/2016 | Tomici | H04W 12/06 |
| 2017/0055313 A1* | 2/2017 | Sharma | H04W 76/15 |

FOREIGN PATENT DOCUMENTS

| | | |
|---|---|---|
| WO | 2015/038911 A1 | 3/2015 |
| WO | 2015/039096 A1 | 3/2015 |

OTHER PUBLICATIONS

"Wi-Fi Calling and the Support of IMS Services over Carrier Wi-Fi Networks", White Paper, C11-733136-00, Oct. 2014, www.cisco.co/go/spwifi, 8 pages.

"3rd Generation Partnership Project; Technical Specification Group Services and System Aspects; 3GPP system fixed broadband access network interworking; Stage 2" (Release 11), Technical Specification, 3GPP TS 23139, V11.3.0, www.3gpp.org, Dec. 2012, 88 pages.

J. Kaippallimalil et al., "Mapping 80211 QoS in a PMIPv6 Mobility Domain" Internet Draft, Cisco, Feb. 10, 2014, 24 pages.

Cisco.com, "Wi-Fi Calling and the Support of IMS Services over Carrier Wi-Fi Networks", Cisco, White Paper, http://www.cisco.com/c/en/us/solutions/collateral/service-provider/service-provider-wi-fi/white-paper-c11-733136.html, C11-733136-00, Oct. 2014, 8 pages.

Inside Secure, "Technical Considerations for Mobile Data Offload with ePDG", White Paper, retrieved form the internet on Dec. 22, 2016, https://www.insidesecure.com/Products-Technologies/Protocol-Security-Toolkits/QuickSec-R-Mobile-VPN-Client/Whitepapers/Technical-Considerations-for-Mobile-Data-Offload-with-ePDG9, pages.

* cited by examiner

NETWORK INITIATED DYNAMIC QUALITY OF SERVICE FOR CARRIER WIRELESS LOCAL AREA NETWORK CALLING

TECHNICAL FIELD

The present disclosure relates to supporting mobile communications via a wireless network, such as a Wi-Fi® network.

BACKGROUND

As millions of users demand Internet connectivity at home, work, as well as on the move, and as the array of data intensive services continues to grow, carriers are experiencing a tremendous surge in the use of mobile data. This tremendous increase in data volume is severely straining the limited available mobile telephony radio resources. The increased demand has led to the deployment of Long Term Evolution (LTE) networks. LTE networks have taken some of the pressure off 3G networks, but are not sufficient to meet the increasing demand driven by increasing amounts of, e.g., High-Definition (HD) video streams and voice over LTE (VoLTE) services.

Operators are thus taking action to meet the ever-rising mobile Internet data demand, with efforts under way, e.g., to integrate a wireless local area network, such as a Wi-Fi network, into the mobile core for data offload. A Wi-Fi network's relatively low cost, relatively simple architecture and usage of non-licensed spectrum makes it an attractive data solution for mobile operators to fulfill consumers' increasing data demand. On the other hand, the openness and distributed control of Wi-Fi can result in the sacrifice of service quality and security. Notwithstanding, users still expect the same quality of experience and access to the same services regardless of access type.

DESCRIPTION OF EXAMPLE EMBODIMENTS

Overview

Figure 1:
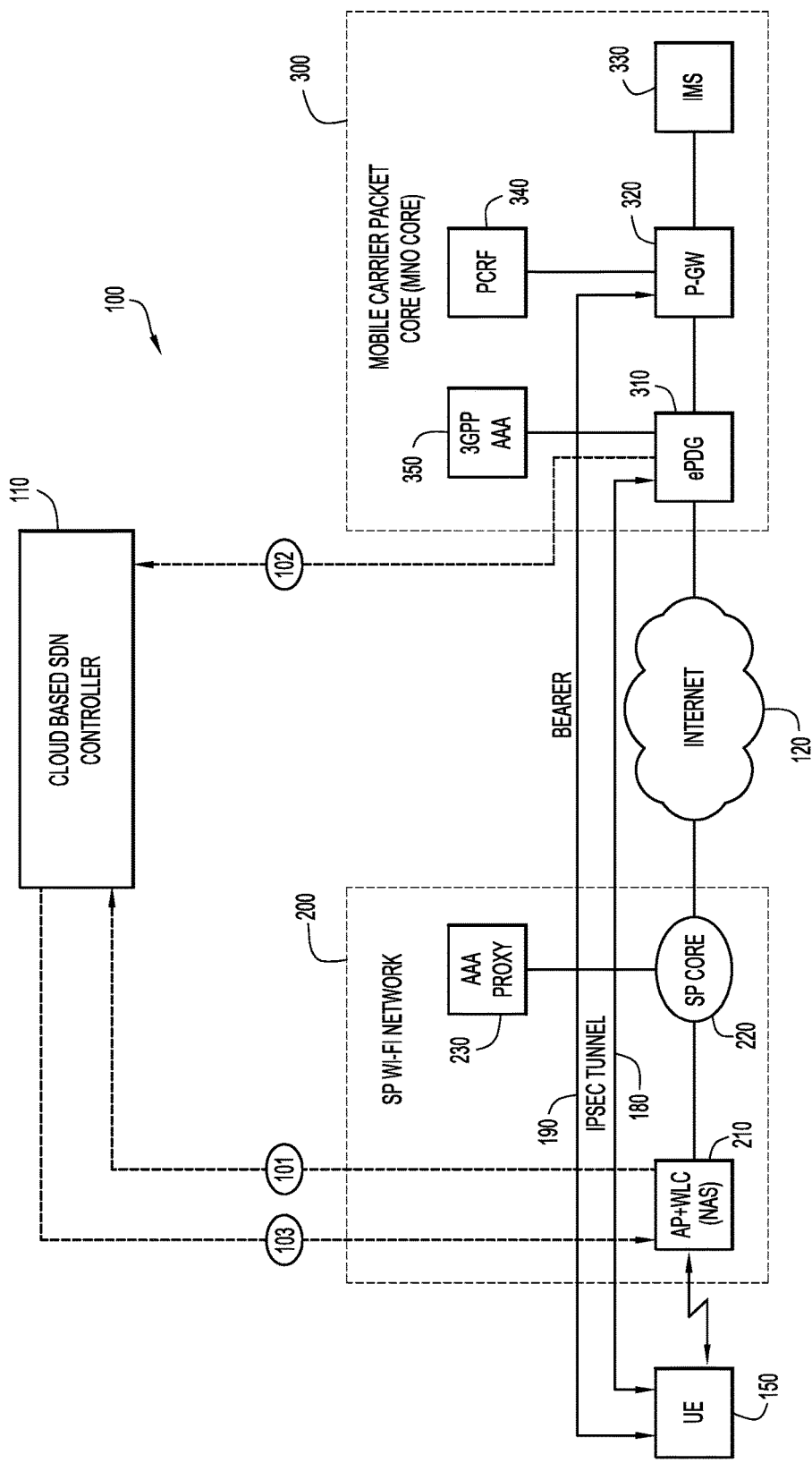
FIG. 1 depicts a network topology and relevant signaling to effect Quality of Service (QoS) policy in a Wi-Fi network when credentials from a Subscriber Identification Module (SIM) are used in accordance with an example embodiment.

Presented herein are techniques for detecting establishment of a bearer associated with a communication session offloaded from a mobile carrier network to a wireless local area network, such as a Wi-Fi® network, and sending, from the mobile carrier network to the wireless local area network, an indication of a level of quality of service to be applied to a segment of the communication session that is conveyed by the wireless local area network. The indication of the level of quality of service may be passed via a network controller.

In one embodiment, a series of operations is performed on a network controller, such as a Software Defined Network (SDN) Controller. The operations include receiving, from a wireless local area network, a mapping message comprising a mapping of (a) an identifier of a wireless device attaching to the wireless local area network to (b) an Internet Protocol (IP) address of a network access server of the wireless local area network, receiving an indication of a level of quality of service to be applied to a communication session associated with the identifier of the wireless device flowing through the wireless local area network, determining, based on the mapping, that the level of quality of service is to be applied by the network access server of the wireless local area network, and sending to the IP address of the network access server of the wireless local area network a message indicating the level of quality of service to be applied to the communication session associated with the identifier of the wireless device flowing through the wireless local area network.

Example Embodiments

Wi-Fi calling deployments by carriers are gaining more traction in the Mobile industry. Many of the carriers have already launched Wi-Fi calling support to their mobile subscribers and many are on track to deploy the feature soon. Current Wi-Fi calling solutions deployed by Mobile operators depend upon an Evolved Packet Data Gateway (ePDG) based Wi-Fi-to-packet core integration model. This approach assumes the Wi-Fi access network is "untrusted" and leverages an Internet Protocol Security (IPSec) tunnel between the Handset (User Equipment (UE) device) and the ePDG.

Carrier Wi-Fi calling deployments are currently happening according to the following scenarios:

1. Carrier Wi-Fi calling using untrusted Wi-Fi hotspots: This is the case when the Mobile Network Operator (MNO) has no visibility or control over the Wi-Fi network quality of experience.

2. Carrier Wi-Fi calling using Roaming Partner Hotspots: In this case, MNOs have an opportunity to work with their Wi-Fi roaming partners to improve the offload experience.

3. Carrier Wi-Fi calling using managed Hotspots owned and operated by MNOs: In this case, MNOs have full control over the hotspot in terms of managing the end user experience for Wi-Fi calling.

The embodiments described herein enable management, by an MNO, of QoS on Wi-Fi hotspots, on a per subscriber basis, to effect acceptable Quality of Experience (QoE) for Wi-Fi calling. Such management in the current environment is challenging due to several factors.

For example, current carrier Wi-Fi calling implementation relies on an SWu-based IPSec tunnel between the UE and the ePDG. As such, there is no visibility into the traffic carried within the SWu tunnel.

Further, with roaming scenarios, the Internet typically becomes part of the session transit path. As a result, Differentiated Services Code Point (DSCP) based marking cannot be trusted at the access network after packets have traversed through Internet.

An IPSec connection from a UE towards a carrier's ePDG gateway does not necessarily mean the session is carrying IMS traffic. SWu connections may be leveraged for other Access Point Names (APNs) such as Enterprise APNs. This makes it harder to apply QoS based up on ePDG addresses & IPSec sessions.

It is noted further that some Mobile operators may want to prioritize Wi-Fi calling from a premium partner's subscriber over a subscriber who is not a premium-roaming partner. In such cases, it is not advisable to rely on passive static approaches.

Thus, and as noted above, the embodiments described herein provide a mechanism to dynamically enable QoS for Wi-Fi calling in a Wireless Local Area Network (WLAN) access network or Wi-Fi network, where the QoS is selected by an MNO. The described implementations are applicable to deployments where an MNO has some direct or indirect control over the management of QoS on the WLAN access network. Further, and as will become evident, the same framework supports QoS on the WLAN access network for both SIM based and non-SIM based WLAN access control. Although the instant embodiments are described herein in the context of Wi-Fi, those skilled in the art will appreciate that the embodiments are equally applicable to any wireless local area network.

Reference is now made to FIG. 1, which depicts a network topology 100 and relevant signaling to effect Quality of Service (QoS) policy in a Wi-Fi network when credentials from a Subscriber Identification Module (SIM) are used in accordance with an example embodiment. As shown, a cloud based Software Defined Network (SDN) Controller 110 (or any suitable network controller) communicates with elements of a service provider Wi-Fi network 200 and a Mobile Carrier Packet Core, or MNO core, 300 (i.e., the back end of an MNO). The Internet 120 (or a private interconnection) enables communication between the service provider Wi-Fi network 200 and the Mobile Carrier Packet Core 300.

The service provider Wi-Fi network 200 comprises an Access Point (AP) (e.g., wireless router) and/or wireless LAN controller (WLC) 210 ("AP/WLC" or Network Access Server ("NAS")), a service provider core network 220 and an AAA proxy 230.

The Mobile Carrier Packet Core (or MNO core) 300 comprises an ePDG 310, a Packet-Gateway (P-GW) 320, an IP Multimedia Subsystem (IMS) server 330, a Policy and Charging Rules Function (PCRF) node 340, and a 3GPP AAA server 350.

User Equipment (UE) 150, in the form of, e.g., a mobile telephone, computer, or other wireless device can connect to AP/WLC 210 wirelessly via Wi-Fi.

The embodiments described herein rely on the "real time" visibility available on the ePDG gateway 310 in the MNO core 300 when voice call signaling or a bearer session is established. Specifically, the following enumerated insights are available on the ePDG 310 to indicate the presence of a Wi-Fi calling client over SWu (the interface between the UE 150 and the ePDG 310 that supports handling of IPSec tunnels, and includes UE-initiated tunnel establishment, user data packet transmission within an IPSec tunnel, tear down of the tunnel and support for fast update of IPSec tunnels during handover between two untrusted non-3GPP IP accesses).

1. Mapping of a Subscriber to IMS APN: IMS Access Point Name (APN) is leveraged for supporting multimedia services such as voice and video. Current IMS APN based deployments predominantly offer voice services.

2. Create Default Bearer Request for a subscriber with QoS Class Identifier (QCI) 5: This default bearer may be used for signaling messages related to an IMS network. QCI 5 maps to an IP priority of 1 which is highest priority over other UE packets and maximum delay of 100 msec between the UE 150 and P-GW 320.

3. Create Dedicated Bearer request for a subscriber with QCI 1: A dedicated bearer will have guaranteed bit rate (GBR) and maximum bit rate (MBR) values defined to support guaranteed bit rate, and further has an IP packet prioritization of 2 which is the second highest.

The ePDG 310 is configured to generate accounting records for the above insights or events in real time. Remote Authentication Dial-In User Service (RADIUS) based accounting is forwarded to a pre-configured RADIUS server destination (not shown) in the form of RADIUS accounting messages. Such RADIUS accounting messages for a given subscriber's session are generated to indicate the creation and deletion of a default bearer for signaling and dedicated bearer for media streams. The RADIUS accounting messages may include the following information:

Chargeable User Identifier (CUID)
Bearer type
SWu Traffic Flow template
GBR and MBR for the GBR bearers
APN-Aggregate Maximum Bit Rate (AMBR) for the non-GBR bearers
QoS Class Identifier (QCI), Allocation and Retention Priority (ARP) values for the bearer
Event Type, including Creation-Accounting start, Deletion-Accounting stop or Update-Accounting Interim. (It is noted that ePDG 310 and UE 150 can re-negotiate Internet Key Exchange (IKEv2) keys (based on lifetime) which changes the Security Parameter Index (SPI) value of the current IKEv2 session. In such an event, ePDG 310 generates an interim-accounting message for all existing bearers to update the SPI value.)

As will be explained below, the generated accounting messages can be leveraged to enable QoS control by an MNO in a Wi-Fi network that is conveying a segment of, e.g., a voice call, over a dedicated bearer.

SIM Based Authentication Scenario on WLAN Access

The instant embodiments assume that either the MNO itself or a roaming partner manages the Wi-Fi access network 200. For either scenario, Extensible Authentication Protocol Authentication Key Agreement (EAP-AKA) or EAP-SIM may be used for Wi-Fi WLAN access authentication. The Wi-Fi access network 200 is configured to capture the CUID of the subscriber (user of UE 150) at the time of the authentication, and forward that information to the cloud based SDN controller 110. This allows the SDN controller 110 to correlate a bearer change event with a subscriber, which has an active session on the Wi-Fi network 200 network.

The embodiment shown in FIG. 1 illustrates a roaming partnership scenario between an operator of the Service Provider (SP) Wi-Fi network 200 and an MNO that operates MNO core 300. It is noted, however, that the same components are relevant for a solution where the MNO itself manages the Wi-Fi access network.

The cloud based SDN Controller 110 in this solution is used to facilitate management of dynamic QoS for the Carrier Wi-Fi calls. Alternatively, an on-premises SDN Controller may also be leveraged. That is, a controlling component may be resident within the service provider Wi-Fi network 200. A cloud based approach, however, may be desirable in an N×N roaming scenario between multiple MNOs and SP Wi-Fi operators. The topology depicted in FIG. 1 leverages three signaling interfaces between various network elements and the SDN controller 110. Functions performed over these signaling interfaces are described below:

Interface 101: Upon completion of WLAN authentication based upon Extensible Authentication Protocol Authentication Key Agreement (EAP-AKA), the AP or WLC 210 generates and sends a RADIUS accounting massage to the SDN Controller 110. The accounting message provides a mapping among UE 150 Media Access Control (MAC) address, Chargeable User ID (CUID) and Network Access Server (NAS) IP address (i.e., address of the AP/WLC 210).

Interface 102: ePDG 310 generates and sends RADIUS accounting messages to notify the default and dedicated bearer related events for the subscriber (i.e., user of UE 150). ePDG 310 includes the CUID and the QoS parameters in such messages. That is, and as shown in FIG. 1, IPSec tunnel 180 is established between the UE 150 and the ePDG 310 via the Internet 120. A bearer 190 is established via the IPSec tunnel 180 and terminates at P-GW 320. The default and dedicated bearer related events that are communicated to Cloud Based SDN Controller 110 in Interface 102 are associated with IPSec tunnel 180 and bearer 190.

Interface 103: SDN controller 110 leverages an SDN Application Programming Interface (API) to command AP or WLC 210 to enable QoS for the subscriber with an active IMS session over bearer 190. SDN Controller 110 can perform CUID to WLC or AP mapping based up on the information received over Interface 101 (i.e., NAS IP address). That is, the SDN Controller 110 can identify the correct AP or WLC to which to send received QoS information from the ePDG 310. QoS may be applied or removed for the following events.

Upon establishment of a default bearer for signaling.

Upon establishment of a dedicated bearer 190 for a voice call.

Upon deletion of the dedicated bearer 190 for a voice call.

Upon deletion of the default bearer for signaling.

Scope of QoS Prioritization by AP/WLC in the Downstream Direction

The granularity of the QoS depends upon whether the Outer IPSec DSCP Markings can be trusted at AP/WLC 210. Two different scenarios are contemplated.

In a first scenario, the IP transport path between AP/WLC 210 and the ePDG 310 is trusted. Such a scenario assumes a converged core model and SWu sessions do not traverse over the Internet. In this case, the DSCP settings in the Outer IP can be trusted by AP/WLC 210 in the downstream direction and mapped to the right Wi-Fi Multimedia (WMM) Access Category (AC) and thus assign the right IEEE 802.11e User Priority (UP) values.

In a second scenario, the IP Transport path between AP/WLC 210 and the ePDG 310 is untrusted. Such a scenario assumes that the SWu session traverses over the Internet between the MNO Core network 300 and the roaming partner's network (i.e., service provider Wi-Fi network 200). In this case, QoS granularity can only be applied up to the IPSec session level. In this case, AP/WLC 210 may apply UP values corresponding to signaling for the client IPSec session when there is no active calls. When active calls are detected, the UP value can be upgraded to the one corresponding to voice.

Scope of QoS Prioritization for AP/WLC in the Upstream Direction

In the upstream direction, it is up to the UE 150 to select/implement the appropriate IEEE 802.11e UP values. Depending upon the instructions from the SDN controller 110, the AP/WLC 210 can take the following actions for the upstream traffic for a subscriber before forwarding to the northbound IP network:

1. Map UP values to corresponding DSCP on the IPSec outer IP header. This may already have been performed by the UE 150 and the AP/WLC 210 need only retain the value(s).

2. Reset the DSCP values for the IPSec Outer Header.

3. Ignore the DSCP values for the IPSec outer header from UE 150 and assign a value provided by SDN controller 110.

Thus, as will be appreciated by those skilled in the art, the mobile carrier does not have direct control over the QoS of a Wi-Fi segment of a communication (voice) path that may traverse the Internet 120 via an IPSec tunnel 180. By having the SDN Controller 110, or other controller component, act as a mapping agent between the AP/WLC 210 and ePDG 310, it is possible for the ePDG to apply, impose or direct a selected level of QoS for the Wi-Fi component or segment of the communication (voice) path. The mapping is made possible through, in this case, the use of the CUID that is available both to the AP/WLC 210 via the UE's SIM card and to the ePDG 310, which is designated to select an appropriate QoS, and send an indication thereof to the SDN controller 110.

Non-SIM Authentication Scenarios for WLAN Access

Figure 2:
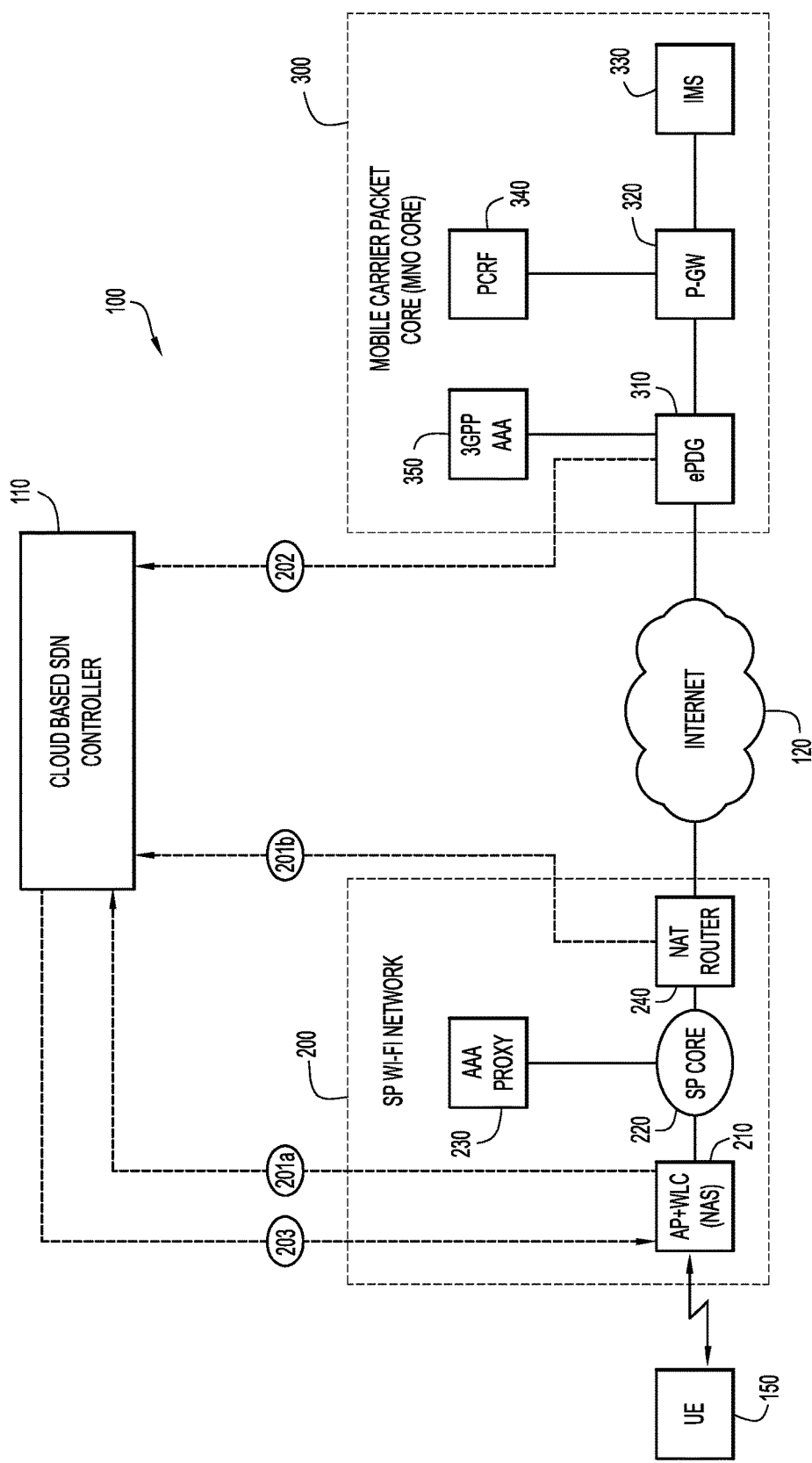
FIG. 2 depicts a network topology and relevant signaling to effect Quality of Service (QoS) policy in a Wi-Fi network when credentials from a Subscriber Identification Module (SIM) are not available in accordance with an example embodiment.

FIG. 2 depicts a network topology and relevant signaling to effect Quality of Service (QoS) policy in a Wi-Fi network when credentials from a SIM are not used in accordance with an example embodiment. As will be described below, a common identifier, different from the CUID, is used to target the correct subscriber (user of UE 150) for purposes of applying, imposing or directing the desired level of QoS for the Wi-Fi segment of a communication path between the UE 150 and the MNO core 300.

Specifically, enterprise networks providing Wi-Fi service may rely on Enterprise Wi-Fi Protected Access (WPA) based authentication scenarios and may not onboard SP subscribers based up on SIM credentials. In such scenarios, a common transient User ID between the MNO core 300 and Wi-Fi network 200, such as the CUID, will not be available. In order to apply dynamic QoS, the embodiment illustrated in FIG. 2 relies on IPSec outer IP addresses. In this regard, in many cases, Wi-Fi subscribers receive private non-routable IP addresses and a Network Address Translator (NAT) router 240 translates the private non-routable IP address into a public IP address before forwarding to external networks such as the Internet 120. The embodiment of FIG. 2 is similar to the SIM scenario of FIG. 1, but with minor updates.

In this embodiment, an additional signaling interface is introduced. Functions performed over each of the depicted signaling interfaces are described below:

Interface 201*a*: Upon completion of WLAN authentication based upon some Non-SIM based mechanism, the AP/WLC 210 generates and sends a RADIUS accounting massage to the SDN controller 110. This Accounting message provides mapping between the subscriber MAC address, subscriber IP Address and NAS IP address (AP/WLC 210).

Interface 201*b*: NAT router 240 uses this interface to generate and send a RADIUS accounting message to the SDN Controller 110, when a new binding entry is created for a matching subnet from the private address space. That is, private to public IP address mapping is shared via this interface.

Interface 202 is similar to Interface 102 described with respect to FIG. 1. That is, ePDG 310 generates and sends RADIUS accounting messages to notify the default and dedicated bearer related events for the subscriber (i.e., user of UE 150). ePDG 310 can provide the outer IPSec address that was provided by NAT router 240, to enable SDN Controller to effect a mapping to the correct UE 150.

Interface 203: The SDN controller 110 leverages an SDN API to command the AP/WLC 210 to enable QoS for the subscriber (user of UE 150) with an active IMS session. SDN Controller 110 can perform subscriber to AP/WLC mapping based upon the information received over signaling interfaces 101a and 101b, namely the outer IP address used by NAT 240 and known to ePDG 310. QoS may be applied or removed for the same events described in connection with FIG. 1.

Thus, as explained above, as in the embodiment describe in connection with FIG. 1, the mobile carrier does not have direct control over the QoS of a Wi-Fi component or segment of a communication (voice) path that may traverse the Internet 120 via an IPSec tunnel 180. By having the SDN Controller 110, or other controller component, act as a mapping agent between the AP/WLC 210 and ePDG 310, it is possible for the ePDG to apply, impose or direct a selected level of QoS for the Wi-Fi segment of the communication (voice) path. In the case of the embodiment illustrated in FIG. 2, the mapping is made possible through the use of the outer IP address used by a NAT router. That address, known by the NAT router and by the ePDG 310 is shared with the SDN controller 110 so that the correct subscriber can be targeted for appropriate control of QoS during Wi-Fi calling.

Figure 3:
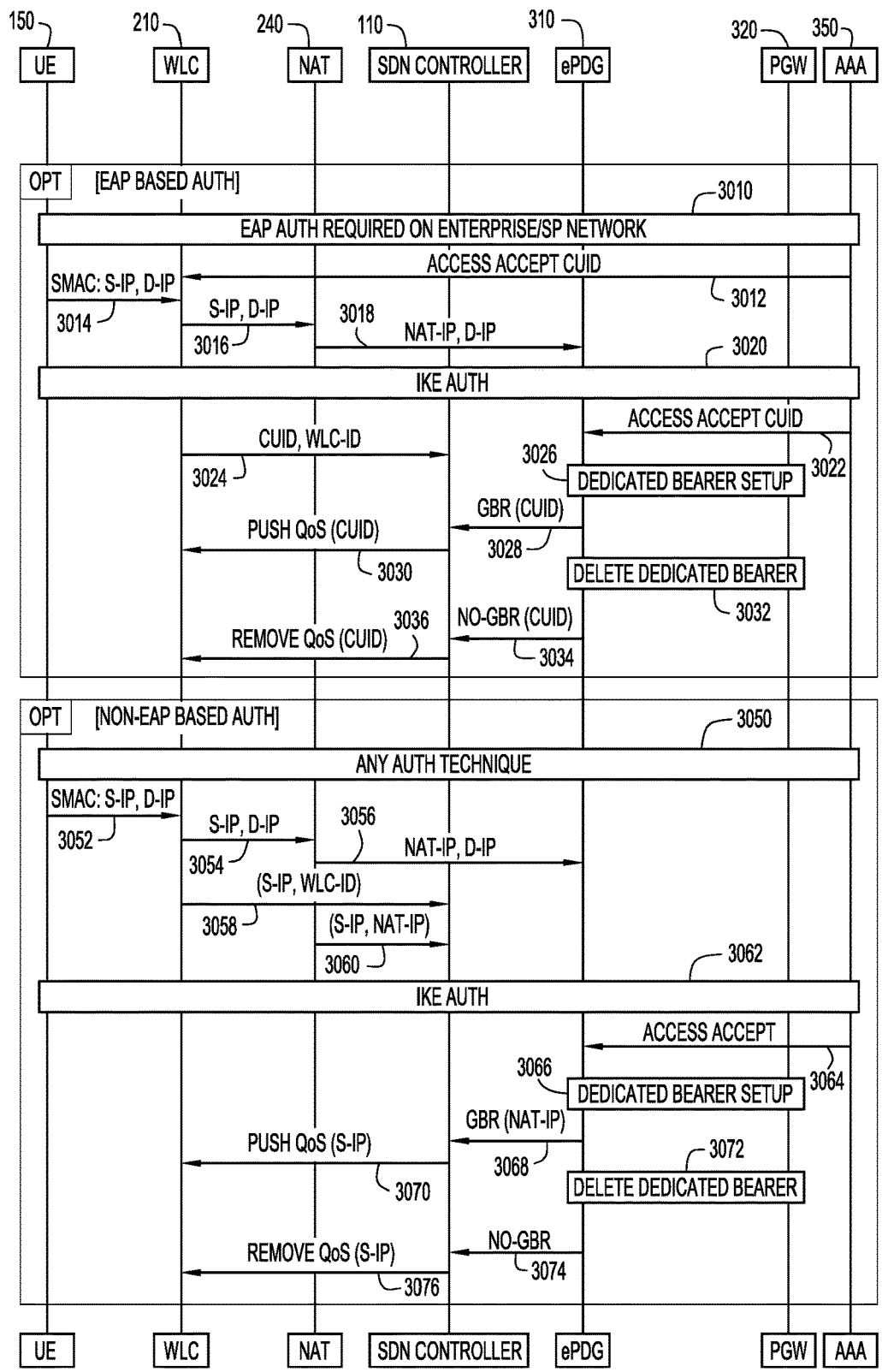
FIG. 3 is a ladder diagram illustrating signaling among several components in the topologies shown in FIGS. 1 and 2 to effect QoS policy in a Wi-Fi network in accordance with an example embodiment.

FIG. 3 is a ladder diagram illustrating signaling among several components in the topologies shown in FIGS. 1 and 2 to effect QoS policy in a Wi-Fi network in accordance with an example embodiment.

The network elements in FIG. 3 correspond to those in FIGS. 1 and 2 and, for brevity, will not be described again. In the ladder diagram, reference numerals 3010-3036 represent operations in connection with an Extensible Authentication Protocol (EAP) based authentication scenario, and reference numerals 3050-3076 represent operations in connection with a non-EAP based authentication scenario.

Specifically, at 3010, the several network components can join the network upon appropriate authorization via EAP. At 3012, WLC 210 receives an Accept Access message for a CUID of a given UE 150. At 3014, UE 150 communicates its MAC address (source MAC), and its source IP address and destination address with WLC 210. Where a NAT router 240 is involved, that source IP address and destination IP address are supplied thereto at 3016. At 3018, NAT router 240 translates the source IP address to a public NAT IP address and communicates the same, along with the destination IP address, to the ePDG 310. Using Internet Key Exchange (IKE) authorization at 3020, AAA server 350 sends an Access Accept message to ePDG 310 at 3022. At 3024, WLC 210 sends to SDN controller 110 a mapping of the CUID to a WLC identifier, e.g., in accordance with interface 101. At 3026, a dedicated bearer is established, one of the events or insights that triggers the ePDG 310 to generate and send a RADIUS accounting message. At 3028, ePDG 310 is configured to apply or impose a certain QoS for the Wi-Fi segment of the call path by sending to SDN controller 110 a guaranteed bit rate (GBR) for the CUID of the given UE 150, e.g., in accordance with interface 102. At 3030, SDN controller pushes the QoS in the form of the GBR to WLC 210, e.g., in accordance with interface 103. That QoS is then implemented by WLC 210 to ensure that the MNO's desired QoS is being applied for the entire call path, even when the Wi-Fi segment of the call path is not (necessarily) under its direct control.

At a later time, at 3032, the dedicated bearer is deleted or taken down, which is yet another trigger event for ePDG 310. At 3034, ePDG 310 communicates to SDN controller 110 to delete the GBR request for the CUID of the given UE 150, e.g., in accordance with interface 102. At 3036, SDN controller communicates with WLC 210 to remove the previously applied QoS for that CUID, e.g., via interface 103. In this way, QoS can be applied and removed by the MNO.

Still with reference to FIG. 3, the following operations may be performed in connection with a non-EAP based authorization scenario. Specifically, at 3050, the several network components can join the network using any authorization technique. At 3052, UE 150 communicates its MAC address (source MAC), and its source IP address and destination address to WLC 210. Where a NAT router 240 is involved, that source IP address and destination IP address are supplied thereto at 3054. At 3056, NAT router 240 translates the source IP address to a public NAT IP address and communicates the same, along with the destination IP address, to the ePDG 310. At 3058, WLC 210 communicates the source IP address and its WLC identifier to SDN controller 110, e.g., via interface 201a. At 3060, NAT router 240 communicates the source IP address and its IP address to SDN controller 110, e.g., via interface 201b.

Using Internet Key Exchange (IKE) authorization at 3062, AAA server 350 sends an Access Accept message to ePDG 310 at 3064. At 3066, a dedicated bearer is established. At 3068, ePDG 310 is configured to apply or impose a certain QoS for the Wi-Fi segment of the call path by sending to SDN controller 110 a guaranteed bit rate (GBR) for the NAT IP address (and presumably for, ultimately,) the given UE 150, e.g., in accordance with interface 202. At 3070, SDN controller pushes the QoS in the form of the GBR to WLC 210, e.g., in accordance with interface 103. That QoS is then implemented by WLC 210 to ensure that the MNO's desired QoS is being applied for the entire call path, even when the Wi-Fi segment of the call path is not (necessarily) under its direct control.

At a later time, at 3072, the dedicated bearer is deleted or taken down. At 3074, ePDG 310 communicates to SDN controller 110 to delete the GBR request for the NAT IP address (and presumably for, ultimately,) the given UE 150, e.g., in accordance with interface 202. At 3076, SDN controller communicates with WLC 210 to remove the previously applied QoS for that source IP address, e.g., via interface 203. In this way, QoS can be applied and removed by the MNO, even without knowledge of, e.g., the UE's CUID.

Figure 4:
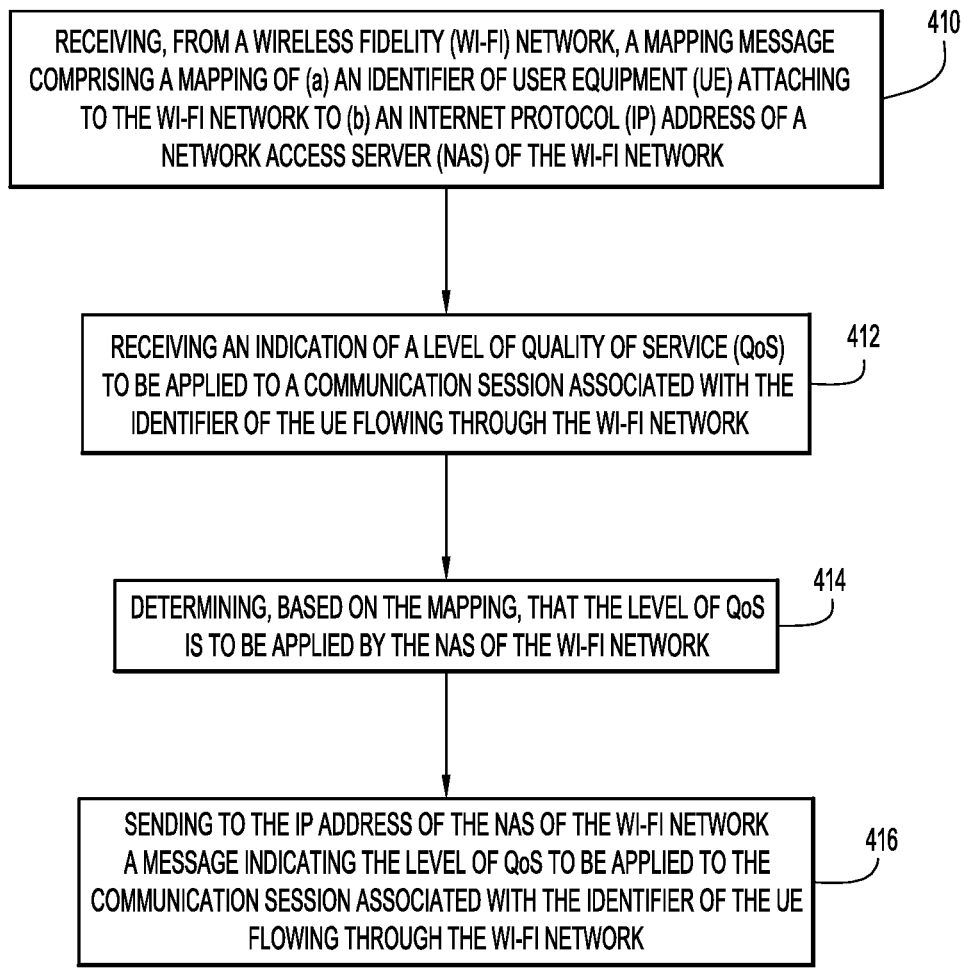
FIGS. 4 and 5 are flow charts illustrating operations to effect QoS policy in a Wi-Fi network in accordance with example embodiments.
Figure 5:
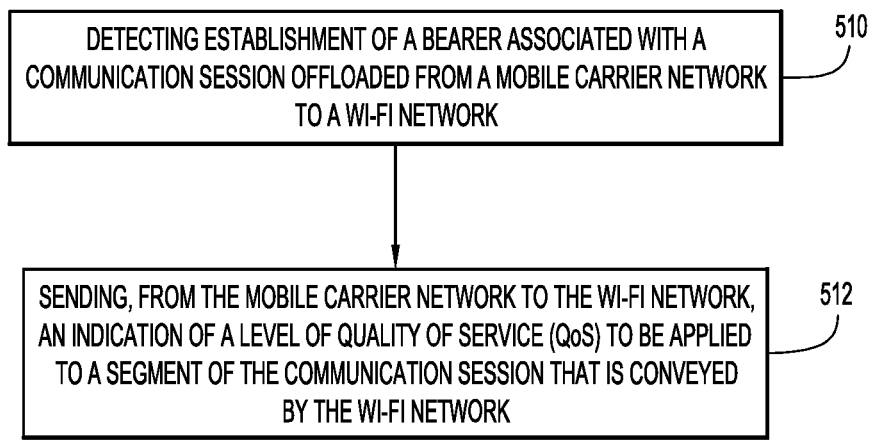

FIGS. 4 and 5 are flow charts illustrating operations to effect QoS policy in a Wi-Fi network in accordance with an example embodiment. Reference is first made to FIG. 4, which illustrates operations performed at, e.g., an SDN controller. At 410, there is an operation of receiving, from a Wireless Fidelity (Wi-Fi) network, a mapping message comprising a mapping of (a) an identifier of User Equipment (UE) attaching to the Wi-Fi network to (b) an Internet Protocol (IP) address of a Network Access Server (NAS) of the Wi-Fi network. At 412, an indication of a level of Quality of Service (QoS) to be applied to a communication session associated with the identifier of the UE flowing through the Wi-Fi network is received. At 414, it is determined, based on the mapping, that the level of QoS is to be applied by the NAS of the Wi-Fi network. Finally, at 416, there is an operation of sending to the IP address of the NAS of the Wi-Fi network a message indicating the level of QoS to be applied to the communication session associated with the identifier of the UE flowing through the Wi-Fi network.

Reference is now made to FIG. 5, which illustrates a series of operations that may be performed by an ePDG. At 510, the ePDG may detect establishment of a bearer associated with a communication session offloaded from a mobile carrier network to a Wi-Fi network. At 512, the ePDG may send, from the mobile carrier network to the Wi-Fi network, an indication of a level of Quality of Service (QoS) to be applied to a segment of the communication session that is conveyed by the Wi-Fi network. It is noted that the PCRF 340, or any other element within Mobile Carrier packet Core 300 could likewise supply the indication of the desired level of QoS toward the Wi-Fi network.

Figure 6:
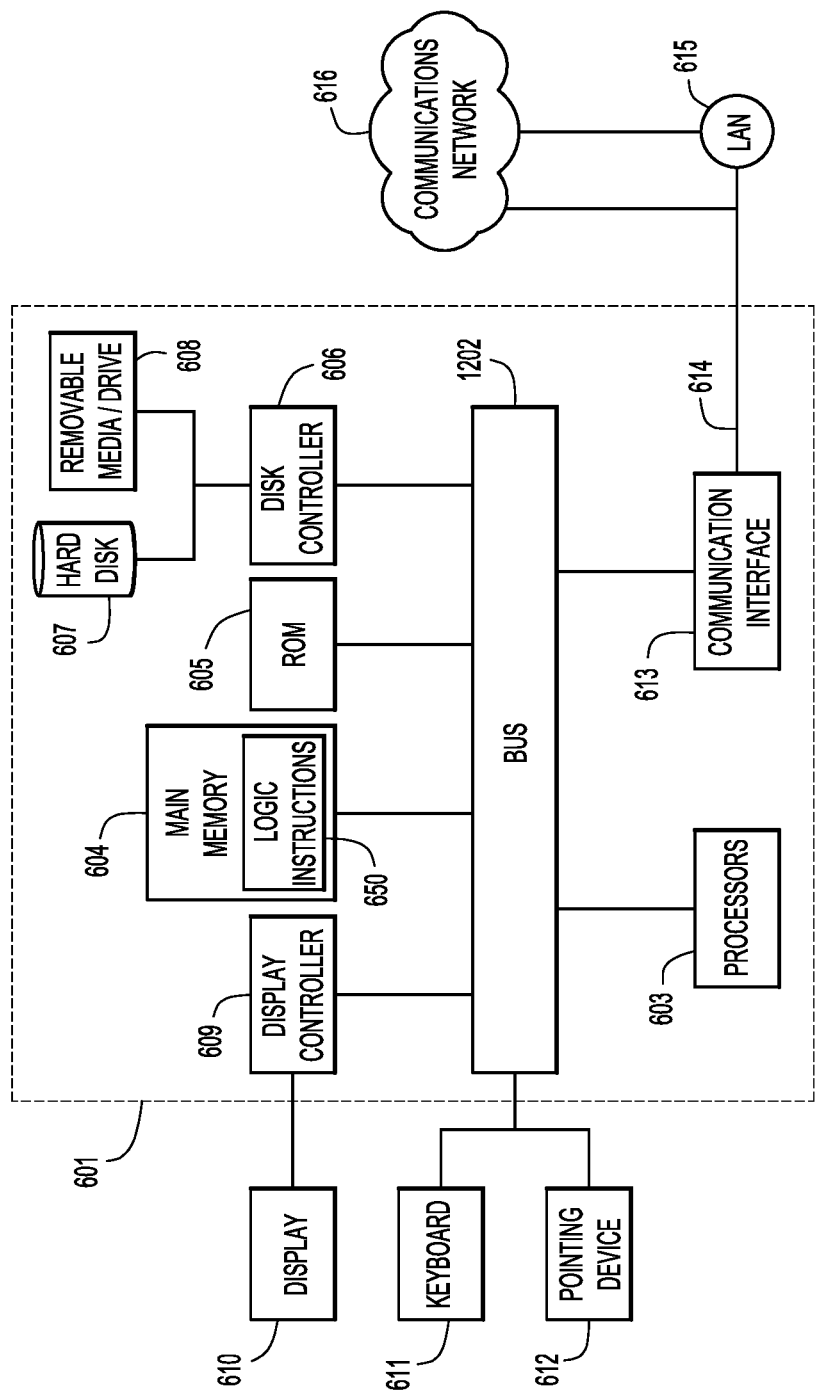
FIG. 6 depicts a device (e.g., a Wi-Fi Access Point or network controller) on which aspects of the several described embodiments may be implemented.

FIG. 6 depicts a block diagram of an apparatus (e.g., a Network Controller, ePDG, or Wi-Fi Access Point) on which the several described embodiments may be implemented.

The apparatus may be implemented on or as a computer system 601. The computer system 601 may be programmed to implement a computer based device. The computer system 601 includes a bus 602 or other communication mechanism for communicating information, and a processor 603 coupled with the bus 602 for processing the information. While the figure shows a single block 603 for a processor, it should be understood that the processor 603 represents a plurality of processors or processing cores, each of which can perform separate processing. The computer system 601 may also include a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions (e.g., the logic to perform the operations of FIGS. 4 and/or 5 described throughout and indicated as logic instructions 650) to be executed by processor 603. In addition, the main memory 604 may be used for storing temporary variables or other intermediate information during the execution of instructions by the processor 603.

The computer system 601 may further include a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 may also include a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT), liquid crystal display (LCD), light emitting diode (LED) display, etc., for displaying information to a computer user. The computer system 601 may include input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing operations of the embodiments described herein in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the described embodiments, and for enabling the computer system 601 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616, e.g., Internet 120. For example, the communication interface 613 may be a wired or wireless network interface card or modem (e.g., with SIM card) configured to attach to any packet switched (wired or wireless) LAN or WWAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through the communications network 616. The network link 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613.

In summary, in one form, a method is provided. The method includes receiving, from a wireless local area network, such as a Wireless Fidelity (Wi-Fi) network, a mapping message comprising a mapping of (a) an identifier of a wireless device (e.g., User Equipment (UE)) attaching to the wireless local area network to (b) an Internet Protocol (IP) address of a network access server of the wireless local area network, receiving an indication of a level of quality of service to be applied to a communication session associated with the identifier of the wireless device flowing through the wireless local area network, determining, based on the mapping, that the level of quality of service is to be applied by the network access server of the wireless local area network, and sending to the IP address of the network access server of the wireless local area network a message indicating the level of quality of service to be applied to the communication session associated with the identifier of the wireless device flowing through the wireless local area network.

In one implementation, the identifier of the wireless device is a Chargeable User Identifier (CUID) associated with the wireless device or is based on a public IP address designated by a Network Address Translation (NAT) router. The network access server of the wireless local area network may be one of a Wireless Fidelity (Wi-Fi) Access Point (AP) or a Wireless Local Area Network (LAN) Controller (WLC).

In an embodiment, receiving the indication of a level of quality of service to be applied to the communication session associated with the identifier of the wireless device flowing through the wireless local area network includes receiving the indication from an Evolved Packet Data Gateway (ePDG). The operation of receiving may be triggered as a result of establishment of a default bearer for signaling between the wireless device and a mobile carrier packet core or may be triggered as a result of establishment of a dedicated bearer for a voice call between the wireless device and a mobile carrier packet core.

The mapping message may be a Remote Authentication Dial-In User Service (RADIUS) accounting message.

In a further embodiment, sending to the IP address of the network access server of the wireless local area network a message indicating the level of quality of service to be applied to the communication session associated with the identifier of the wireless device flowing through the wireless local area network includes sending an assigned User Priority (UP) value compliant with the IEEE 802.11e standard or includes sending information to control a quality of service of an IP Security (IPSec) session between the wireless device and an Evolved Packet Data Gateway (ePDG).

In another form, a device is provided that includes an interface unit configured to enable network communications, a memory, and one or more processors coupled to the interface unit and the memory, and configured to: receive, from a wireless local area network, such as a Wireless Fidelity (Wi-Fi) network, a mapping message comprising a mapping of (a) an identifier of a wireless device (e.g., User Equipment (UE)) attaching to the wireless local area network to (b) an Internet Protocol (IP) address of a network access server of the wireless local area network, receive an indication of a level of quality of service to be applied to a communication session associated with the identifier of the wireless device flowing through the wireless local area network, determine, based on the mapping, that the level of quality of service is to be applied by the network access server of the wireless local area network, and send to the IP address of the network access server of the wireless local area network a message indicating the level of quality of service to be applied to the communication session associated with the identifier of the wireless device flowing through the wireless local area network.

The identifier of the wireless device may be a Chargeable User Identifier (CUID) associated with the wireless device or may be based on a public IP address designated by a Network Address Translation (NAT) router.

The network access server of the wireless local area network may be one of a Wireless Fidelity (Wi-Fi) Access Point (AP) or a Wireless Local Area Network (LAN) Controller (WLC).

In an embodiment, the mapping message may be a Remote Authentication Dial-In User Service (RADIUS) accounting message.

Further, the one or more processors may be configured to receive the indication of a level of quality of service to be applied to the communication session associated with the identifier of the wireless device flowing through the wireless local area network as a result of at least one of establishment of a default bearer for signaling between the wireless device and a mobile carrier packet core or establishment of a dedicated bearer for a voice call between the wireless device and a mobile carrier packet core.

In still another form, a further method is provided. The method includes detecting establishment of a bearer associated with a communication session offloaded from a mobile carrier network to a wireless local area network, such as a Wi-Fi network, and sending, from the mobile carrier network to the wireless local area network, an indication of a level of quality of service to be applied to a segment of the communication session that is conveyed by the wireless local area network.

In the method, the bearer associated with a communication session offloaded from a mobile carrier network to a wireless local area network may include at least one of a default bearer for signaling or a dedicated bearer for a voice call.

In the method, sending, from the mobile carrier network to the wireless local area network, an indication of a level of quality of service to be applied to a segment of the communication session that is conveyed by the wireless local area network includes sending a message from an Evolved Packet Data Gateway (ePDG).

The above description is intended by way of example only. Various modifications and structural changes may be made therein without departing from the scope of the concepts described herein and within the scope and range of equivalents of the claims.

What is claimed is:

1. A method, performed by a controller, comprising:
receiving, from a wireless local area network, a first Remote Authentication Dial-In User Service (RADIUS) message comprising a mapping of (a) an identifier of a wireless device attaching to the wireless local area network to (b) an Internet Protocol (IP) address of a network access server of the wireless local area network;
receiving from a mobile network operator, in a second RADIUS message, an indication of a level of quality of service to be applied to a communication session associated with the identifier of the wireless device flowing through the wireless local area network;
determining, based on the mapping provided in the first RADIUS message, that the level of quality of service is to be applied by the network access server of the wireless local area network; and
sending to the IP address of the network access server of the wireless local area network a message indicating the level of quality of service to be applied to the communication session associated with the identifier of the wireless device flowing through the wireless local network.

2. The method of claim 1, wherein the identifier of the wireless device comprises a Chargeable User Identifier (CUID) associated with the wireless device.

3. The method of claim 1, wherein the network access server of the wireless local area network comprises one of a wireless local area network access point or a wireless local area network controller.

4. The method of claim 1, wherein the identifier of the wireless device is based on a public IP address designated by a Network Address Translation (NAT) router.

5. The method of claim 1, wherein receiving the indication of the level of quality of service to be applied to the communication session associated with the identifier of the wireless device flowing through the wireless local area network comprises receiving the indication from an Evolved Packet Data Gateway (ePDG).

6. The method of claim 1, wherein receiving the indication of the level of quality of service to be applied to the communication session associated with the identifier of the wireless device flowing through the wireless local area network is triggered as a result of establishment of a default bearer for signaling between the wireless device and a mobile carrier packet core.

7. The method of claim 1, wherein receiving the indication of the level of quality of service to be applied to the communication session associated with the identifier of the wireless device flowing through the wireless local area network is triggered as a result of establishment of a dedicated bearer for a voice call between the wireless device and a mobile carrier packet core.

8. The method of claim 1, wherein sending to the IP address of the network access server of the wireless local area network the message indicating the level of quality of service to be applied to the communication session associated with the identifier of the wireless device flowing through the wireless local area network comprises sending an assigned User Priority (UP) value compliant with the IEEE 802.11e standard.

9. The method of claim 1, wherein sending to the IP address of the network access server of the wireless local area network the message indicating the level of quality of service to be applied to the communication session associated with the identifier of the wireless device flowing through the wireless local area network comprises sending information to control a quality of service of an IP Security (IPSec) session between the wireless device and an Evolved Packet Data Gateway (ePDG).

10. A device comprising:
an interface unit configured to enable network communications;
a memory; and
one or more processors coupled to the interface unit and the memory, and configured to:
receive, from a wireless local area network, a first Remote Authentication Dial-In Service (RADIUS) message comprising a mapping of (a) an identifier of a wireless device attaching to the wireless local area network to (b) an Internet Protocol (IP) address of a network access server of the wireless local area network;
receive from a mobile network operator, in a second RADIUS message, an indication of a level of quality of service to be applied to a communication session associated with the identifier of the wireless device flowing through the wireless local area network;
determine, based on the mapping in the first RADIUS message, that the level of quality of service is to be applied by the network access server of the wireless local area network; and
send to the IP address of the network access server of the wireless local area network a message indicating the level of quality of service to be applied to the communication session associated with the identifier of the wireless device flowing through the wireless local area network.

11. The device of claim 10, wherein the identifier of the wireless device comprises a Chargeable User Identifier (CUID) associated with the wireless device.

12. The device of claim 10, wherein the network access server of the wireless local area network comprises one of a wireless local area network access point or a wireless local area network controller.

13. The device of claim 10, wherein the identifier of the wireless device is based on a public IP address designated by a Network Address Translation (NAT) router.

14. The device of claim 10, wherein the one or more processors are configured to receive the indication of the level of quality of service to be applied to the communication session associated with the identifier of the wireless device flowing through the wireless local area network by receiving the indication from an Evolved Packet Data Gateway (ePDG).

15. The device of claim 10, wherein the one or more processors are configured to receive the indication of the level of quality of service to be applied to the communication session associated with the identifier of the wireless device flowing through the wireless local area network as a result of at least one of establishment of a default bearer for signaling between the wireless device and a mobile carrier packet core or establishment of a dedicated bearer for a voice call between the wireless device and a mobile carrier packet core.

16. A method comprising:
  detecting, by a mobile carrier network, establishment of a bearer associated with a communication session offloaded from the mobile carrier network to a wireless local area network; and
  in response to detecting, by the mobile carrier network, establishment of the bearer, sending, from the mobile carrier network to the wireless local area network, via a Remote Authentication Dial-In Service (RADIUS) message sent to an intermediate controller, an indication of a level of quality of service for a segment of the communication session that is conveyed by the wireless local area network.

17. The method of claim 16, wherein the bearer associated with the communication session offloaded from the mobile carrier network to the wireless local area network comprises at least one of a default bearer for signaling or a dedicated bearer for a voice call.

18. The method of claim 16, wherein sending, from the mobile carrier network to the wireless local area network, the indication of a level of quality of service to be applied to a segment of the communication session that is conveyed by the wireless local area network comprises sending a message from an Evolved Packet Data Gateway (ePDG).

* * * * *